US006431532B1

(12) United States Patent
McKenzie et al.

(10) Patent No.: US 6,431,532 B1
(45) Date of Patent: Aug. 13, 2002

(54) VARIABLE GEOMETRY DAMPENING AND TRAILING ARM SUSPENSION INCLUDING SAME

(75) Inventors: Thomas A. McKenzie, Spring Lake; William J. Hicks, Muskegon, both of MI (US)

(73) Assignee: The Holland Group, Inc., Holland, MI (US)

( * ) Notice: Subject to any disclaimer, the term of this patent is extended or adjusted under 35 U.S.C. 154(b) by 0 days.

(21) Appl. No.: 09/766,281

(22) Filed: Jan. 19, 2001

Related U.S. Application Data

(63) Continuation-in-part of application No. 09/182,907, filed on Oct. 30, 1998, now Pat. No. 6,220,587, which is a continuation-in-part of application No. PCT/US98/04457, filed on Mar. 6, 1998.
(60) Provisional application No. 60/040,338, filed on Mar. 7, 1997, and provisional application No. 60/047,467, filed on May 23, 1997.

(51) Int. Cl.[7] .............................................. B60G 11/26
(52) U.S. Cl. .................. 267/256; 267/259; 280/124.13; 280/124.128
(58) Field of Search ................................ 267/256, 136, 267/131, 228, 217, 218, 64.16, 64.27, 64.28, 64.25, 113, 117, 118, 259; 188/129, 381, 378; 180/89.12, 89.13, 89.14, 89.15, 89.16, 89.18, 89.19; 280/124.128, 124.125, 124.157, 124.13, 86.5, 124.116

(56) References Cited

U.S. PATENT DOCUMENTS

| 3,716,213 A | 2/1973 | Lacey |
| 3,794,344 A | 2/1974 | Raidel |
| 3,797,798 A | 3/1974 | Magruder et al. |
| 3,966,223 A | 6/1976 | Carr |
| 4,401,179 A | 8/1983 | Anderson |
| 4,735,272 A | 4/1988 | Sjostrom et al. |
| 4,802,690 A | * 2/1989 | Raidel ................. 280/124.157 |
| 5,230,528 A | * 7/1993 | Van Raden et al. ... 280/124.116 |
| 5,253,853 A | 10/1993 | Conaway et al. |
| 5,651,585 A | 7/1997 | Van Duser |
| 5,924,712 A | * 7/1999 | Pierce ................. 280/124.128 |
| 6,220,587 B1 | * 4/2001 | McKenzie et al. .......... 267/256 |

FOREIGN PATENT DOCUMENTS

| DE | 1 806 380 | 6/1970 |
| DE | 40 15 011 C1 | 7/1991 |
| WO | PCT/US98/04457 | 6/1998 |
| WO | WO 99/62740 | * 12/1999 |

* cited by examiner

Primary Examiner—Pam Rodriquez
Assistant Examiner—Melanie Torres
(74) Attorney, Agent, or Firm—McGarry Bair LLP

(57) ABSTRACT

Vibration dampening assembly alone and in vehicle trailing arm suspension has a link member, a shock absorber and a lever member. The link member has a first end pivotally interconnected with either of the trailing arm or the vehicle frame at a first support pivot. A lever member is pivotally interconnected with the link member second end at a link pivot intermediate the first and second ends of the lever member. A shock absorber has a first end of pivotally interconnected with the lever member second end at a shock pivot and has a second end pivotally interconnected with the other of the trailing arm or the vehicle frame at a second support pivot spaced from said first support pivot. The lever member is pivotally interconnected with either the trailing arm or the vehicle frame at a main pivot connection located at the first end of the lever member.

13 Claims, 8 Drawing Sheets

VARIABLE GEOMETRY DAMPENING AND TRAILING ARM SUSPENSION INCLUDING SAME

CROSS-REFERENCE TO RELATED APPLICATIONS

This application is a continuation-in-part of U.S. patent application Ser. No. 09/182,907; now U.S. Pat. No. 6,220,587, filed Oct. 30, 1998, which is a continuation-in-part of International Application No. PCT/US98/04457, filed Mar. 6, 1998, which claims the benefit of U.S. Provisional Application Serial No. 60/040,338, filed Mar. 7, 1997, and U.S. Provisional Application Serial No. 60/047,467, filed May 23, 1997.

BACKGROUND OF THE INVENTION

1. Field of the Invention

This invention relates to a vibration dampening assembly. In one of its aspects, the invention relates to a vibration dampening assembly for use in a suspension system in a vehicle. In one of its aspects, the invention relates to a vehicle trailing arm suspension with a vibration dampening assembly. In another of its aspects, the invention relates to a suspension system for use, for example, between a cab and a frame of a truck.

2. Description of the Related Art

In Conaway et al. U.S. Pat. No. 5,253,853, a vibration dampening device is disclosed for use between a truck body and a cab. The vibration dampening device includes a link pivotally mounted at one end to the frame of a truck and pivotally mounted at another end to a lever. The lever is pivotally mounted at one end to a suspended member, for example, a cab of a truck and is pivotally mounted at another end to one end of a shock absorber. The other end of the shock absorber is pivotally mounted also to the suspended body or cab at a pivot point spaced from the pivot point mounting of the lever first end to the suspended body. This device is said to isolate a suspended body or truck cab from the force vibration of the supporting body and provide a non-linear response to vibrational movement of the suspended body with respect to the support body. Whereas some beneficial vibration isolation takes place with a device according to the Conaway et al. '853 patent, there are some operational limitations in the design of a suitable dampening assembly and there are practical difficulties in manufacturing this vibration dampening device with proper design characteristics. The distance between the axes of pivot mounts of the lever to the suspended body (main pivot) and the lever to the link controls the relative amount of vertical movement between the suspended and supporting bodies and influences the displacement versus resistive force characteristics of the device. It has been found that the axes of these two pivots should be spaced about ⅜" apart. Greater spacing between these two pivot axes gives a wider range of uncontrolled oscillation, and results in a fairly abrupt transition between the oscillation force and dampening force. A smooth transition between the oscillation and the dampening portion of the force versus displacement curve is necessary for an acceptable dampening device. However, at ⅜" spacing between the pivot axes, manufacture of the dampening device becomes difficult because the bearings of the pivot axes overlap. However, the geometry of the device precludes this type of arrangement.

Trailing arm suspensions typically have a beam pivotally mounted to a hanger bracket that is mounted to a vehicle frame. An axle is mounted to the beam a spaced distance from the pivot mounting, typically intermediate the ends of the beam. A spring, typically an air spring, is mounted between the frame and the beam, typically at the other end of the beam. The beam can be rigid or flexible. A shock absorber is typically mounted between the axle or the beam and the frame to dampen vibrations between the beam and the frame. These shock absorbers typically have a linear force vs. distance response. An example of a spring beam trailing arm suspension, which is designed for use on a bus steering axle and is identified as AS-090/120/140, has been sold publicly by Holland Neway International, Inc. of Muskegon, Mich., USA since at least 1999.

SUMMARY OF THE INVENTION

According to the invention, a vibration dampening assembly for isolating a suspended body from the force vibrations of a supporting body comprises a link member, a shock absorber and a lever member connected between the suspended body and the supporting body. A first plate is adapted for mounting to the suspended body or supporting body. A second plate is adapted for mounting to the other of said suspended body or supporting body. The link member has a first end pivotally interconnected with the second plate at a first support pivot. A lever member is pivotally interconnected with the link member second end at a link pivot intermediate the first and second ends of the lever member. A shock absorber has a first end of pivotally interconnected with the lever member second end at a shock pivot and has a second end pivotally interconnected with the second plate at a second support pivot spaced from said first support pivot. The lever member is pivotally interconnected with said first plate at a main pivot connection located at the first end of the lever member.

In one embodiment of the invention, the first plate is a trailing arm in a trailing arm suspension and the second plate is a portion of a vehicle frame.

In one embodiment, the shock absorber central axis and said lever member longitudinal axis are parallel when the supporting body and suspended body are in a static condition. Preferably, the main pivot connection also lies on the lever member longitudinal axis. Further, the second support pivot also lies on the lever member longitudinal axis. In another preferred embodiment, the link pivot also lies on the lever member longitudinal axis.

Still further according to the invention, a vehicle trailing arm suspension has a variable geometry dampening assembly mounted between a trailing arm and a vehicle frame. The trailing arm suspension comprises a pair of trailing arm assemblies adapted to mount on a vehicle frame having a pair of spaced frame rails. Each of the trailing arm assemblies includes a frame bracket adapted to be mounted to one of the frame rails, a beam pivotally mounted at one end to the frame bracket for pivotal movement about a pivot axis and adapted to carry an axle at another end and a spring mounted to the trailing arm a spaced distance from the one end and adapted to mount to the corresponding vehicle frame rail to resist the rotational movement of the trailing arm toward the frame. The geometry dampening assembly includes (a) link member having first and second ends, the first end of said link member adapted to be pivotally interconnected with the corresponding vehicle frame rail at a first support pivot;

(b) a lever member having a longitudinal axis and first and second ends, said lever member is pivotally interconnected with the link member second end at a link pivot spaced from the second end of the lever member;

(c) a shock absorber having a central axis and first and second ends, the first end of said shock absorber is pivotally interconnected with the lever member second end at a shock pivot, and the second end of said shock absorber is adapted to be pivotally interconnected with the corresponding vehicle frame rail at a second support pivot spaced from said first support pivot; and (d) the lever member is pivotally interconnected with said beam at a main pivot connection spaced from said link pivot.

In one embodiment, the link pivot pivotally interconnects the lever member with the link member second end intermediate the first and second ends of the lever member. In this embodiment, the main pivot connection interconnects the lever member with the beam at the first end of the lever member.

In another embodiment, the link pivot pivotally interconnects the lever member with the link member second end at the first end of the lever member. In this embodiment, the main pivot connection interconnects the lever member with the beam intermediate the first and second ends of the lever member.

Other objects, features, and advantages of the invention will be apparent from the ensuing description in conjunction with the accompanying drawings.

DESCRIPTION OF THE PREFERRED EMBODIMENT

Figure 1:
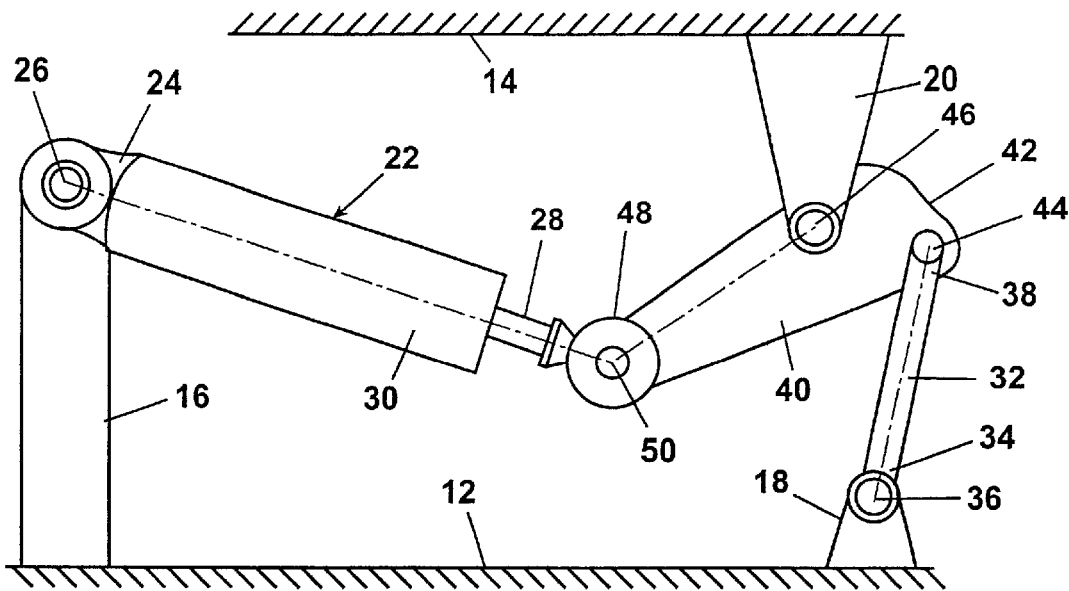
FIG. 1 schematically illustrates a vibration dampening assembly according to the invention.

Referring now to FIG. 1, there is shown a vibration dampening assembly according to the invention for dampening vibration or movement between a support plate and an impact plate 14. This form of the invention is an "extension differential opposite configuration." A support plate can, for example, be a frame of a truck and the impact plate 14 can, for example, be a cab of a truck body. The vibration dampening assembly according to the invention is intended to be used in a manner similar to the suspension vibration dampening device illustrated in U.S. Pat. No. 5,253,853 wherein a suspension system is used between the impact plate 14 and the support plate 12. A suitable suspension system is disclosed in U.S. Pat. No. 5,253,853 which is incorporated herein by reference. Another suitable suspension is disclosed in literature entitled Holland Neway AS-Series R.V./Bus Air Steel Suspension, AS-090/120/140, published by Holland Neway International, Inc. of Muskegon, Mich., USA in 1999.

In the vibration dampening assembly illustrated in FIG. 1, a pivot support 16 and a pivot support 18 are mounted to the support plate 12. In like manner, a pivot support 20 is mounted to the impact plate 14. A hydraulic shock absorber 22 is pivotally mounted at one end 24 to the pivot support 16 through a pivot pin 26. The shock absorber 22 has a resistance rod 28 which telescopes within a cylindrical housing 30 in conventional fashion. The movement of the resistance rod into and out of the cylindrical housing 30 is resisted in conventional fashion in a linear manner proportional to the rate at which the resistance rod 28 moves with respect to the cylindrical housing.

A link member 32 is pivotally mounted at a first end 34 to the pivot support 18 through a pivot pin 36. A lever member 40 has a first end 42 and a second end 48. The lever member 40 is pivotally mounted at the first end 42 to a second end 38 of the link member 32 through a link pivot pin 44. The lever member 40 is further pivotally mounted to the pivot support 20 through a main pivot pin 46 at an intermediate point between the ends 42 and 48 of the lever member 40. The lever member 40 is further pivotally mounted to a free end of the resistance rod 28 through a shock pivot pin 50. As illustrated in FIG. 1, the main pivot pin 46 is positioned on the lever member 40 intermediate the link pivot pin 44 and the shock pivot pin 50.

The elements of the embodiment of FIG. 1 are shown for purposes of illustration in a position in which the impact plate and the support plate are in a rest or design height position. The embodiment in FIG. 1 represents the most general physical configuration or arrangement. In this situation, the applied damping force versus vertical motion relationship will be highly unsymmetrical for motions about the static position shown. The response of the vibration dampening assembly shown in FIG. 1 will be asymmetrical for jounce and rebound (movement of the impact plate toward and away from the support plate) if the design height is as shown in FIG. 1. If it is desirable for the vibration mounting assembly to exhibit a symmetrical response for jounce and rebound, then the design height (static position) is selected so that the longitudinal axis of the shock absorber is aligned with the axis between the pivot axes of the main pivot pin 46 and the shock pivot pin 50.

In operation of the vibration dampening assembly illustrated in FIG. 1, as the impact plate moves with respect to the support plate, the shock absorber 22 will rotate about the pivot pin 26. The resistance rod 28 telescopes in and out of the cylindrical housing 30 as the shock absorber 22 rotates about the pivot pin 26. At the same time, the lever member 40 rotates about main pivot pin 46 and link member 32 rotates about pivot pin 36. However, the relationship between the movement of the resistance rod within the cylindrical housing 30 is not linear in relation to the displacement of the impact plate 14 with respect to the support plate 12. Relatively small oscillations around the neutral axis (alignment of longitudinal axis of the shock absorber with the pivot axis of the main pivot pin and the shock pivot pin) produce relatively little movement of the shock absorber resistance rod with respect to the cylindrical housing 30 and thus little resistance to oscillations. However, as the displacement between the support plate and the impact plate becomes greater, the resistance rod moves a greater extent with respect to the cylindrical housing 30 and thereby generates a larger reactive force. In the embodiment disclosed in FIG. 1, the transition between the free oscillation range and the resistance range is gradual.

The configuration illustrated in FIG. 1 achieves the desirable performance characteristics with a spacing between the axes of the main pivot pin 46 and the link/lever pivot pin 44 of about ¾". With this degree of spacing between these pivot axes, there is no overlap between the pivot bearings for each of these pivots. Thus, manufacturing of the dampening assembly is not hindered by the proximity of the main pivot pin 46 and the lever/link pivot pin 44 in lever member 40.

Figure 2:
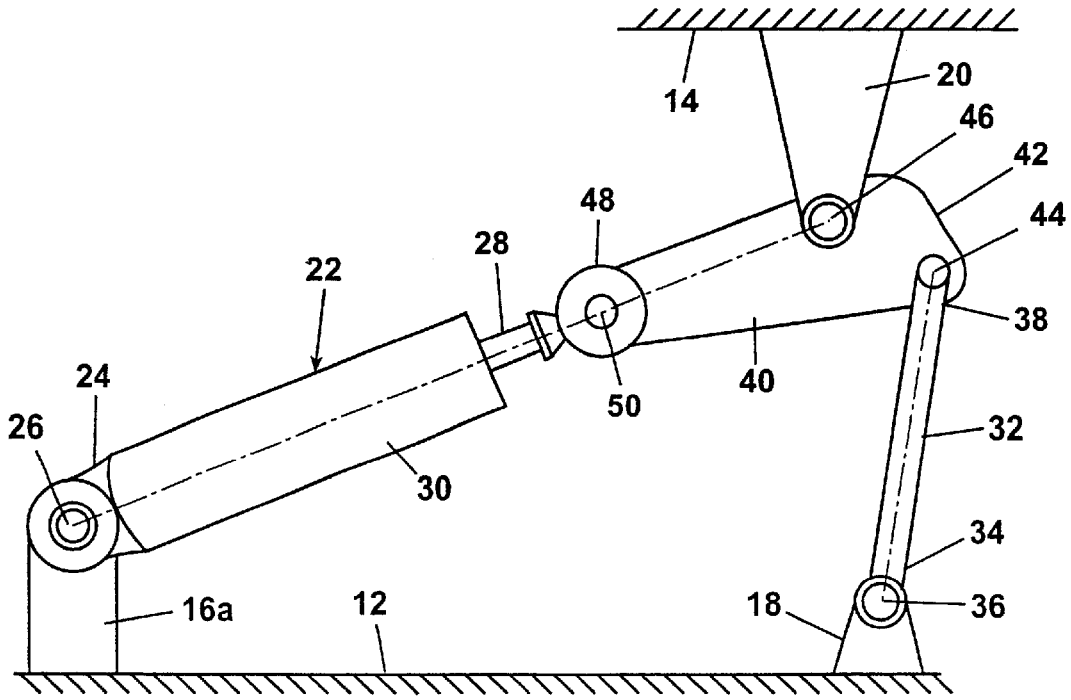
FIG. 2 shows a second embodiment of a vibration dampening assembly according to the invention.

Referring now to FIG. 2, there is shown a second embodiment of the invention wherein like numerals have been used to designate like parts. A support plate 12 has a pivot support 16a and a pivot support 18. The pivot support 16a pivotally mounts one end 24 of a shock absorber 22 through a pivot pin 26. A link member 32 is pivotally mounted to the pivot support 18 at a first end 34 through pivot pin 36. A lever member 40 is mounted at a first end 42 to a second end 38 of the link member 32 through link pivot 44. The lever member 40 is mounted to an impact plate pivot support 20 through a main pivot pin 46 at an intermediate position between the first end 42 and the second end 48 of the lever member 40. The free end of the resistance rod 28 is pivotally mounted to the lever member 40 at the second end 48 through the shock pivot pin 50.

As illustrated in FIG. 2, the axis of pivot pin 26, the axis of shock pivot 50 and the axis of main pivot 46 lie in a common plane and intersect a common line perpendicular to the three axes. In FIG. 2, the elements of the dampening system are represented in a static or design height condition. The operation of the vibration dampening assembly of FIG. 2 operates in substantially the same manner as the operation of the vibration dampening assembly illustrated in FIG. 1 except that a much more symmetric damping resistance versus displacement curve is realized.

Figure 3:
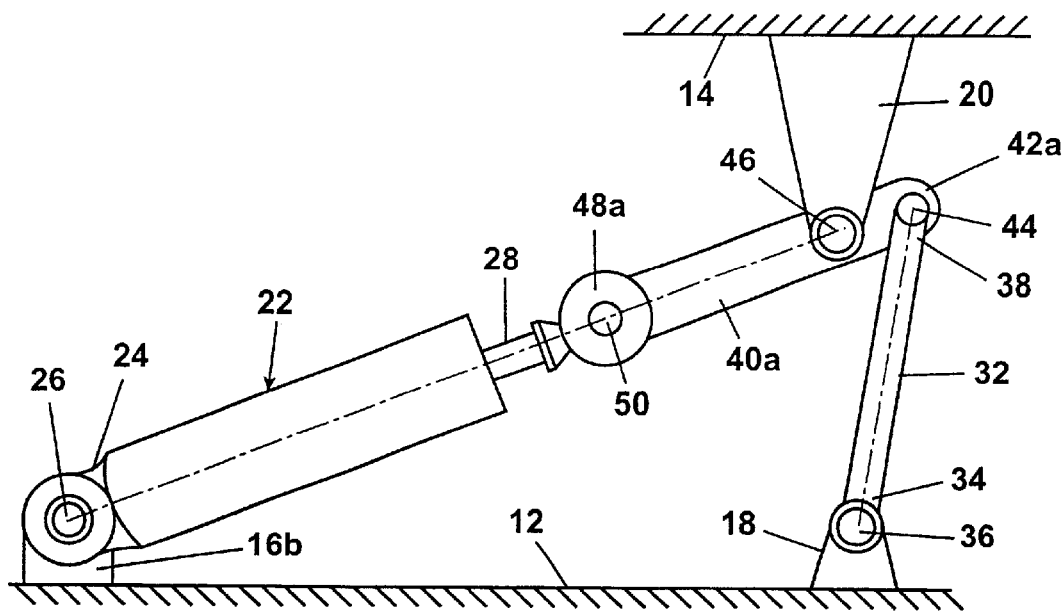
FIG. 3 shows a third embodiment of a vibration dampening assembly according to the invention.

Reference is now made to FIG. 3 for a description of a third embodiment of the invention in which like numerals have been used to designate like parts. The elements are shown in FIG. 3 at static condition or design height. In FIG. 3, a shorter pivot support 16b is mounted to the support plate 12 and the lever member 40a mounts the shock pivot pin 50, the main pivot pin 46 and the link pivot pin 44 in a common plane. In addition, the shorter pivot support 16b supports end 24 of the shock absorber 22 in a relatively lower position so that the rotational axis of pivot pin 26 lies in a common plane with the rotational axes of the shock pivot pin 50, the main pivot pin 46 and the link pivot pin 44 when the impact plate 14 and the support plate 12 are in a static condition or design height position. The operation of the dampening assembly illustrated in FIG. 3 is similar to that illustrated in FIG. 2.

Figure 4:
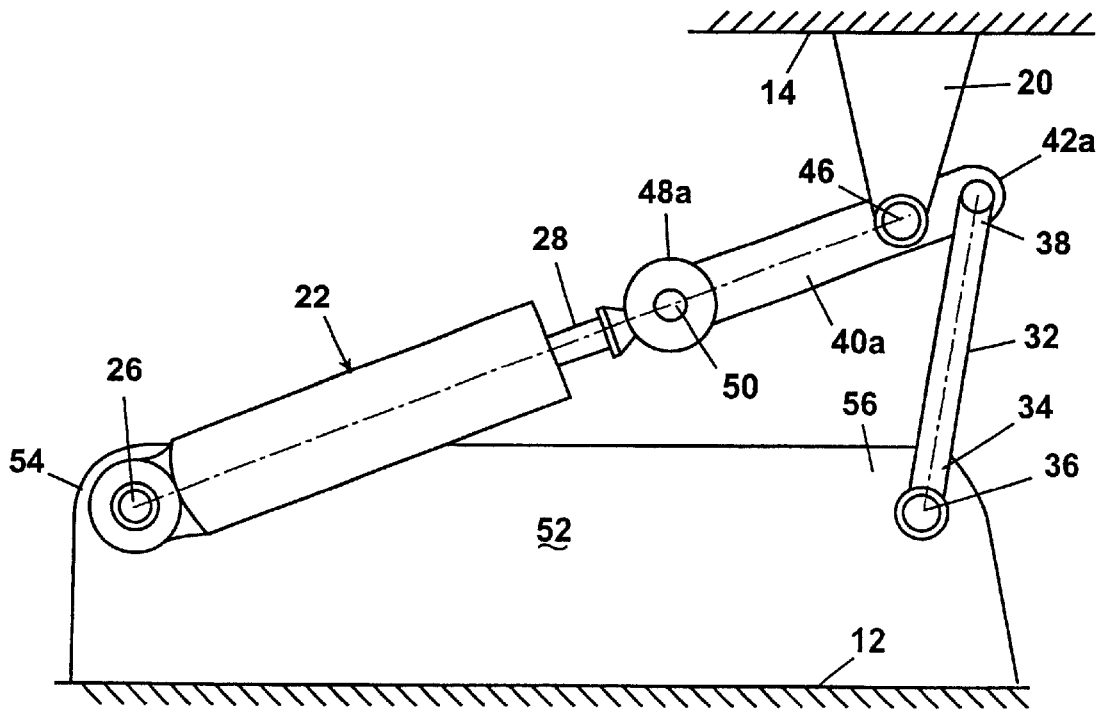
FIG. 4 shows a fourth embodiment of a vibration dampening assembly according to the invention.

Referring now to FIG. 4, there is shown a fourth embodiment of the invention wherein like numerals have been used to designate like parts. In FIG. 4, the elements of the assembly are shown in a static or design height condition. In FIG. 4, a cross member 52 extends from the support plate 12 and toward the impact plate 14. The cross member 52 further pivotally mounts the first end 34 of the link member 32 at an end 56 through pivot pin 36. In addition, the cross member 52 mounts the end 24 of the shock absorber 22 at an end 54 through the pivot pin 26. As in the previous embodiment, the axes of the pivot pins 26, the shock pivot pin 50, the main pivot pin 46 and the link pivot pin 44 lie in a common plane and intersect a common line perpendicular to the axes when the impact plate and the support plate are in a static or design height position.

The operation of the dampening device illustrated in FIG. 4 is similar to that of the dampening assemblies illustrated in FIGS. 2–3.

Figure 5:
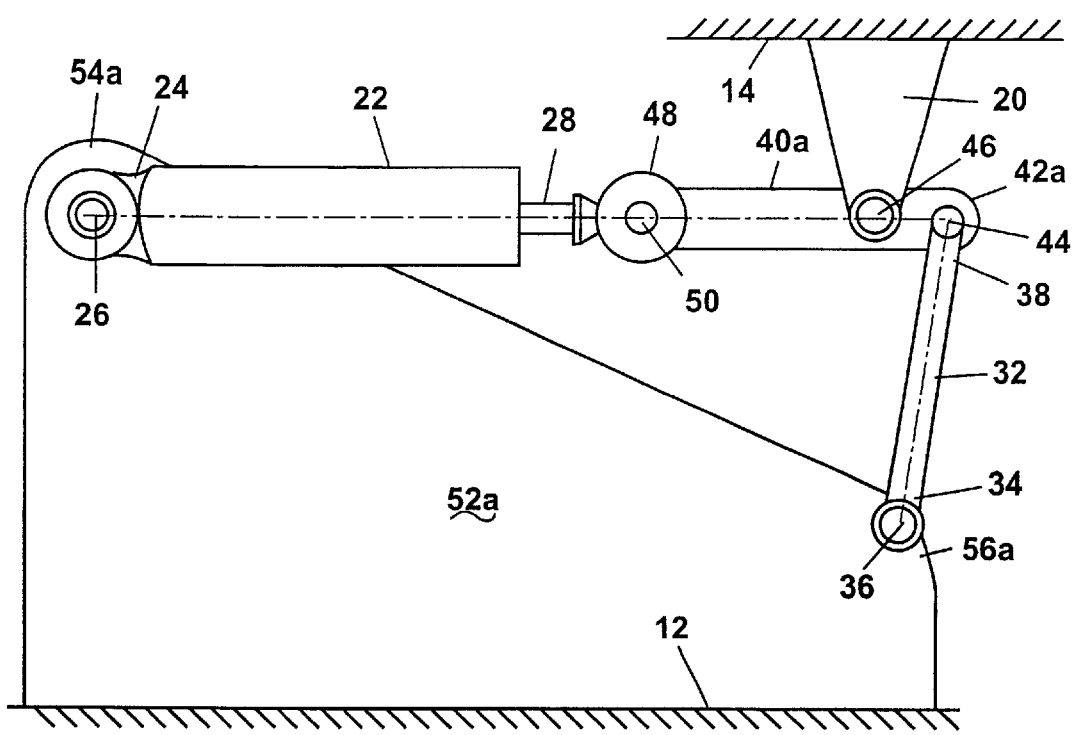
FIG. 5 shows a fifth embodiment of a vibration dampening assembly according to the invention.

Referring now to FIG. 5, there is shown a fifth embodiment of the invention wherein like numerals have been used to designate like parts. In FIG. 5, a cross member 52a mounts at end 56a the link member 32 through link pin 36. The end 24 of the shock absorber 22 is mounted to the cross member 52a at end 54a through pivot pin 26. As illustrated in FIG. 5, the axes of the pivot pin 26, the shock pivot pin 50, the main pivot pin 46 and the link pivot pin 44 lie in a common horizontal plane and intersect a common horizontal line perpendicular to the axes when the assembly is in a static condition at design height. The assembly of FIG. 5 is shown in a static or design height condition.

Figure 13:
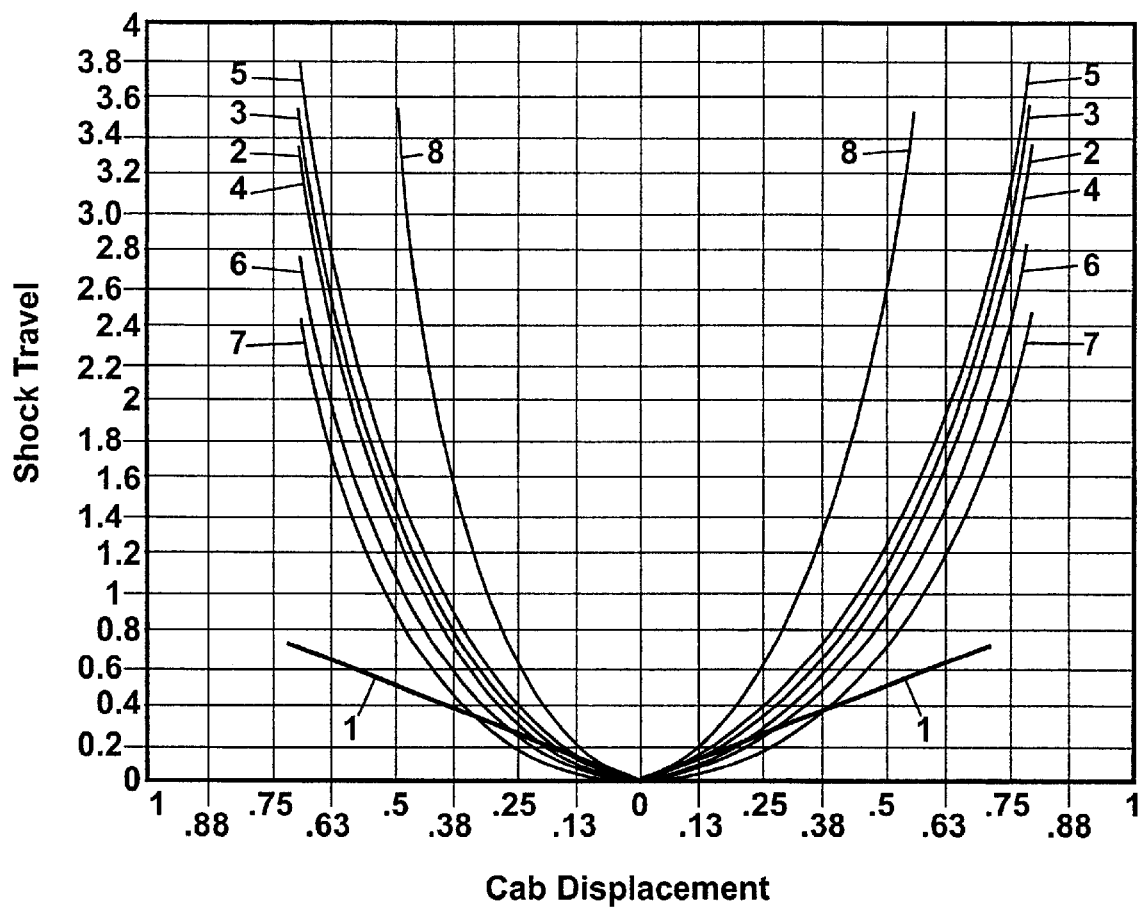
FIG. 13 shows a graph of dampening force versus displacement for several of the embodiments of the invention and also for a prior art dampening assembly.

The operation of the dampening assembly illustrated in FIG. 5 is similar to the operating characteristics of the dampening assembly illustrated in FIGS. 2–4. The shock travel versus cab displacement characteristics of the dampening assembly illustrated in FIG. 5 are shown on curve 2 in FIG. 13. A curve of a conventional vertically oriented shock absorber travel versus cab displacement is shown as curve 1 in FIG. 13 for comparison. The maximum degree of symmetry in jounce/rebound resistance profiles is obtained with this arrangement. The extension differential opposite configuration is shown in FIGS. 1–5, from the most general format in FIG. 1, to the most preferred arrangement in FIG. 5.

Figure 6:
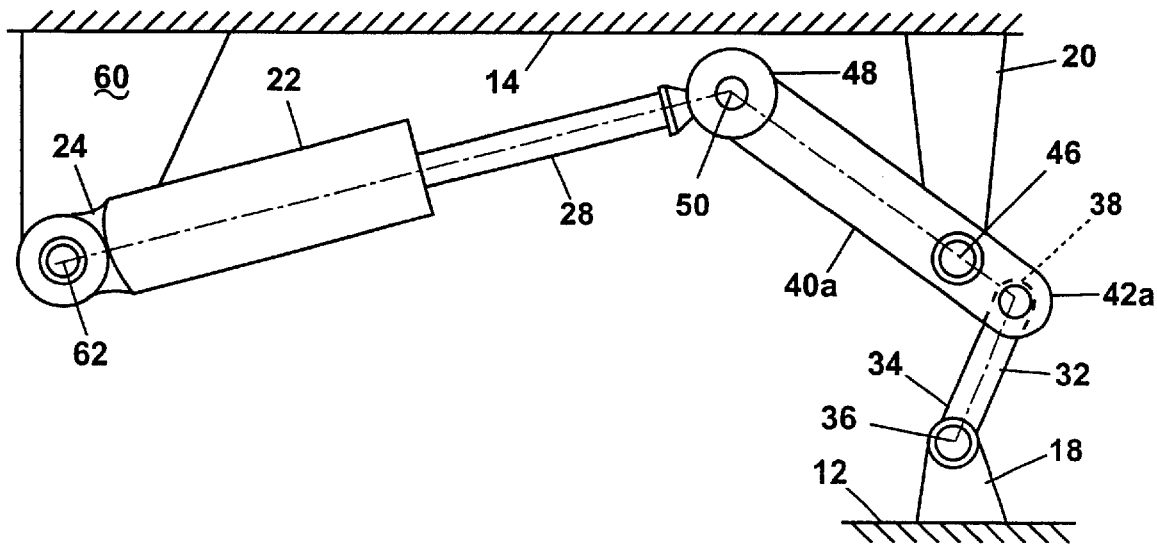
FIG. 6 shows a sixth embodiment of a vibration dampening assembly according to the invention.

Reference is now made to FIG. 6 which shows an extension opposite vibration dampening assembly according to the invention. Like numerals have been used to designate like parts. In the vibration dampening assembly illustrated in FIG. 6, end 24 of the shock absorber 22 is mounted to a pivot support 60 through pivot pin 62. Pivot support 60 is secured to the impact plate 14. The elements of the assembly are shown in FIG. 6 in a position displaced from the static, design height condition as a result of displacement of the impact plate toward the support plate. Ordinarily, the axes of the shock pivot, the main pivot, the link pivot 44 and the pivot pin 62 will lie in a common, essentially horizontal plane and intersect a common horizontal line perpendicular to the axes at static, design height condition.

The operation of the vibration dampening assembly illustrated in FIG. 6 is similar to the operation of the vibration dampening assemblies of FIGS. 1–5. The shock absorber travel versus cab displacement characteristics of the vibration dampening assembly of FIG. 6 are illustrated as curve 3 in FIG. 13.

Figure 7:
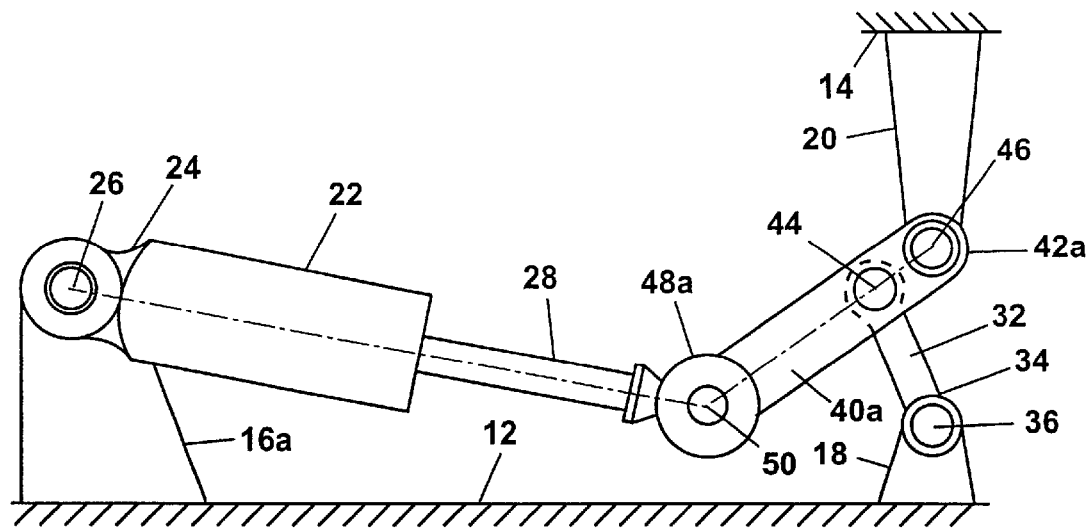
FIG. 7 shows a seventh embodiment of a vibration dampening assembly according to the invention.

Referring now to FIG. 7, there is shown an extension differential vibration dampening assembly wherein like numerals are used to designate like parts. In FIG. 7, the link member 32 is pivotally mounted to the lever member 40a through link pivot pin 44 at a point intermediate the ends 42a and 48a. The link 40a is further mounted to the impact plate 14 at the first end 42a through main pivot pin 46. Thus, the link 32 is pivotally mounted to the lever member 40a at a position intermediate the main pivot pin 46 and the shock pivot pin 50. The elements of the assembly of FIG. 7 are shown in a position displaced from a static, design height condition as a result of the displacement of the impact plate away from the support plate. Ordinarily, the axes of pivot pin 26, shock pivot pin 50, link pivot pin 44 and main pivot pin 46 lie in a common plane and intersect a common line perpendicular to the axes in the same static position.

The operation of the vibration dampening assembly illustrated in FIG. 7 is similar in some respects to the operation of the vibration dampening assemblies illustrated in FIGS. 1–6. However, the operating characteristics are substantially the same as the assembly of FIG. 5 as illustrated in curve 4 in FIG. 13.

Figure 8:
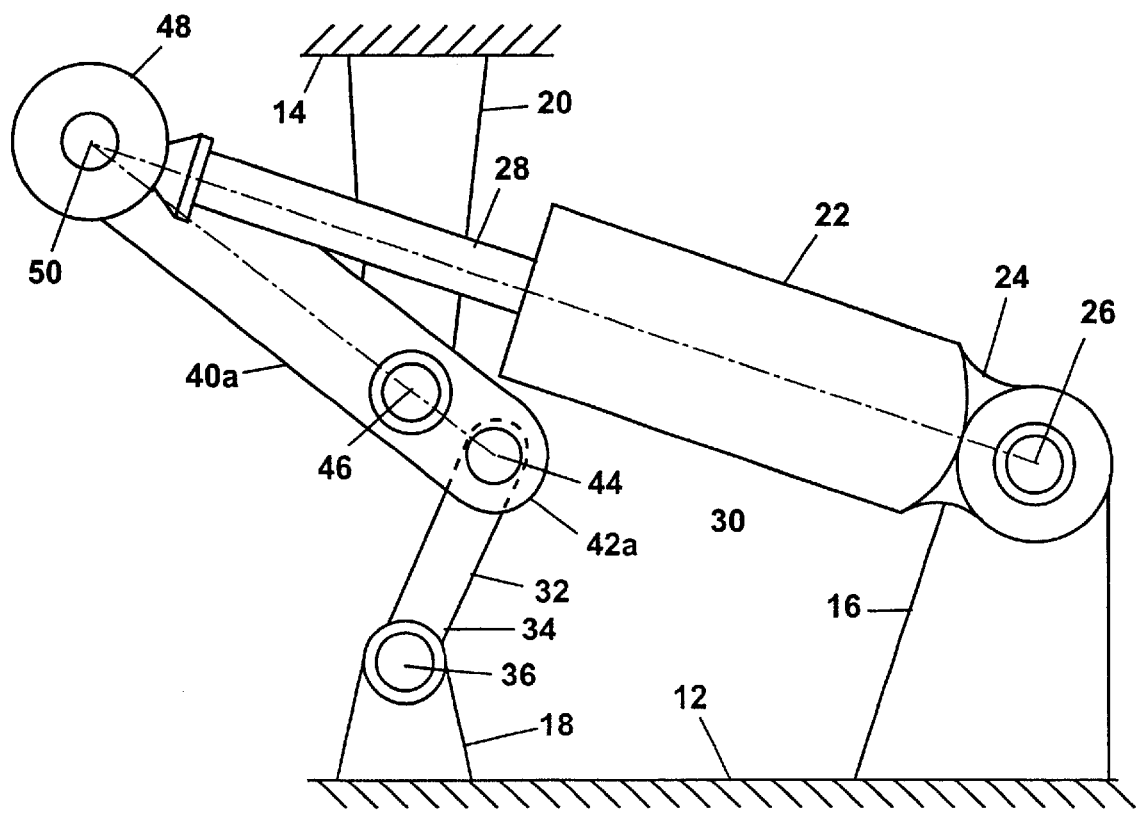
FIG. 8 shows an eighth embodiment of a vibration dampening assembly according to the invention.

Referring now to FIG. 8, there is shown a compression differential opposite vibration dampening assembly according to the invention wherein like numerals are used to designate like parts. In this embodiment, the shock absorber 22 works in compression as the impact plate 14 moves vertically with respect to the support plate 12. In FIG. 8, there is a geometric elevational overlap between the lever 40a and the shock absorber 22 so that as the lever 40a and the shock absorber 22 rotate from a neutral position, the resistance rod 28 will be forced into the cylindrical housing 30 of the shock absorber 22. The relationship of the components of the vibration dampening assembly illustrated in FIG. 8 are shown in a position in which the impact plate is displaced upwardly from the support plate from a design height position. Normally, in a static or design height position, the axes of the pivot pin 26, the shock pivot pin 50, the link pivot pin 44 and the shock pin 50 would essentially lie in a substantially horizontal common plane and intersect a common substantially horizontal line.

The operation of the vibration dampening assembly illustrated in FIG. 8 is similar to the operation of the vibration dampening assemblies illustrated in FIGS. 1–7. The shock absorber versus cab displacement curve, however, is somewhat different and is shown as curve 5 in FIG. 13.

Figure 9:
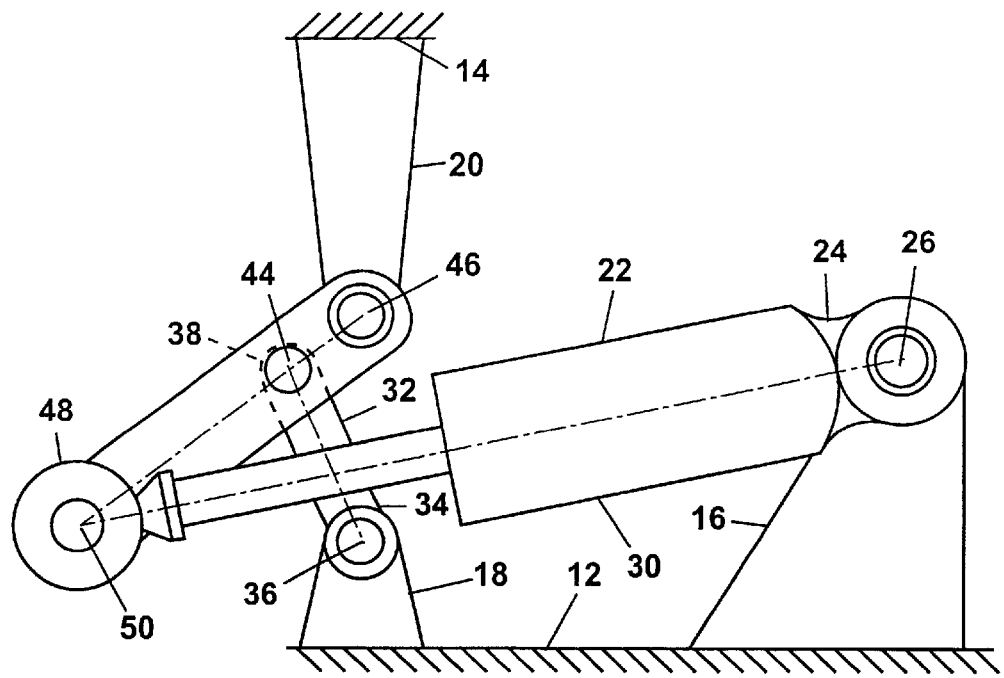
FIG. 9 shows a ninth embodiment of a vibration dampening assembly according to the invention.

Referring now to FIG. 9, there is shown a compression differential vibration dampening assembly wherein like numerals have been used to designate like parts. This embodiment is similar to the embodiment illustrated in FIG. 8 except that the link member 32 is attached to lever 40a intermediate the lever first and second ends. In FIG. 9, the impact plate is shown displaced downwardly with respect to the support plate from a normal static or design height position. Ordinarily, the axes of the shock pivot pin 50, the pivot pin 26, the lever pivot pin 44 and the main pivot pin lie essentially in a common horizontal plane and intersect a common substantially horizontal line perpendicular to the axes when the assembly is in a static or design height position.

The vibration dampening assembly illustrated in FIG. 9 operates in a manner similar to the vibration dampening assemblies of FIGS. 1–8. However, the operating characteristics, i.e., shock absorber travel versus cab displacement, are somewhat different from the embodiments of FIGS. 1–8 and the operating characteristics are illustrated in curve 6 on FIG. 13.

Figure 10:
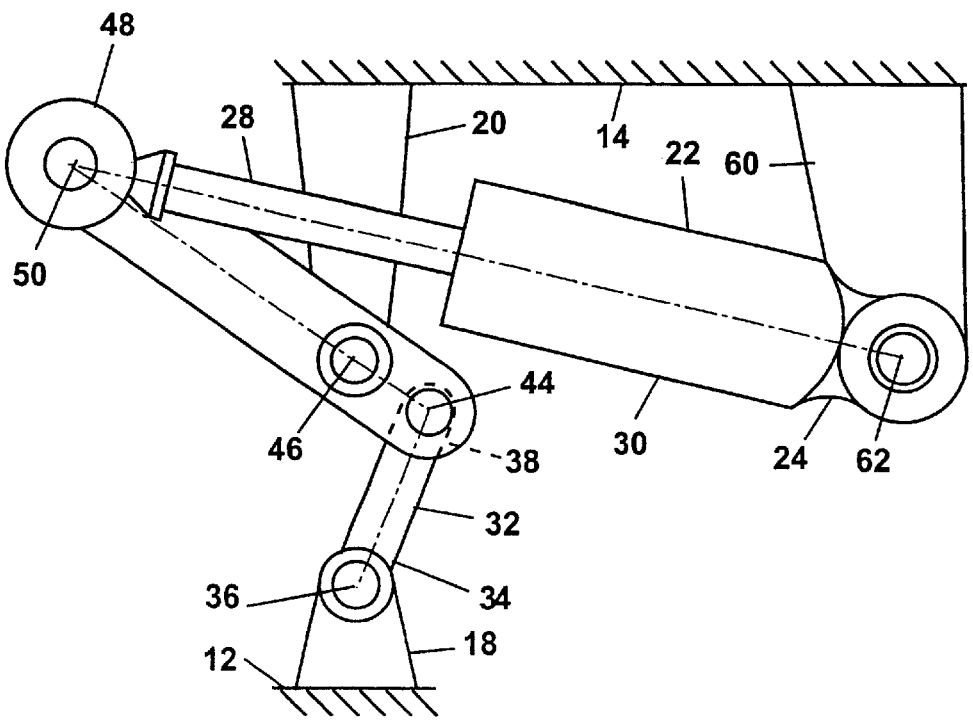
FIG. 10 shows a tenth embodiment of a vibration dampening assembly according to the invention.

Referring now to FIG. 10, there is shown a compression opposite vibration dampening assembly according to the invention wherein like numerals have been used to designate like parts. This embodiment is similar to the embodiment of FIG. 8 except that the shock absorber 22 is anchored to the impact plate 14 instead of the support plate 12. The dampening device of FIG. 10 works similar to the dampening device of FIG. 8 and has operating characteristics similar to those of FIG. 8 as illustrated by curve 7 in FIG. 13. In FIG. 10, the impact plate is shown displaced upwardly from a normal design height condition in which the axes of the shock pivot pin 50, the main pivot pin 46, the link pivot pin 44 and the pivot pin 62 essentially lie in a substantially horizontal plane and intersect a substantially horizontal line perpendicular to the axes.

Figure 11:
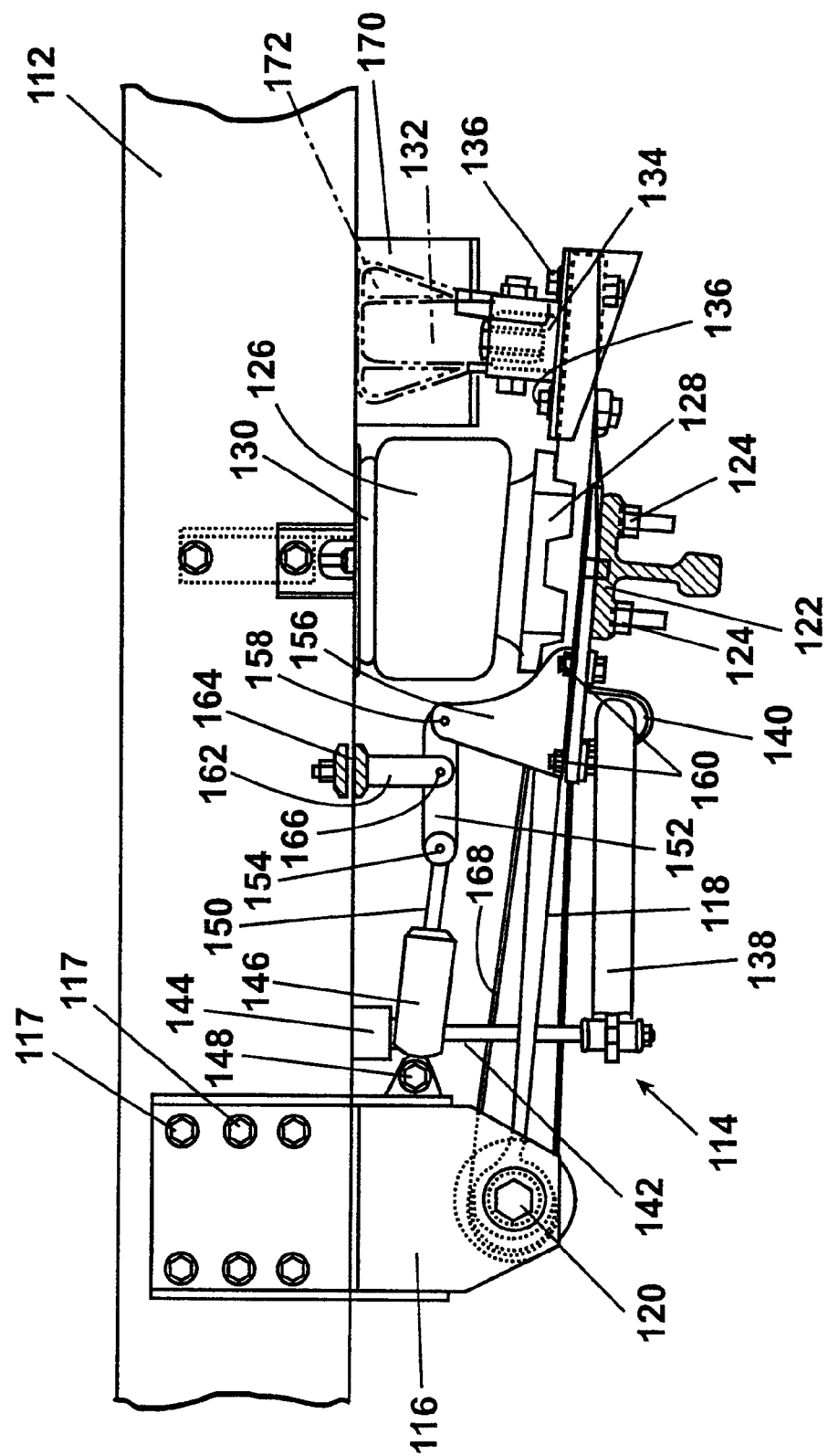
FIG. 11 is a side elevational view of a steerable axle air suspension according to the invention and incorporating a variable geometry damping mechanism.

Referring now to FIG. 11, there is shown a vehicle frame 112 having mounted thereto a suspension system 114 for mounting a steerable front axle. The suspension system 114 comprises a hanger bracket 116 mounted to the frame 112 through bolts 117 and a spring beam trailing arm 118 pivotally mounted to the hanger bracket 116 through a conventional pivot mount 120. An I-beam steer axle 122 is mounted to the spring beam 118 through bolts 124. An air spring 126 is mounted at a lower end to the spring beam 118 through a mounting bracket 128 and at an upper end is mounted to the frame 112 through a conventional mounting bracket 130. A track bar 132 is pivotally mounted at one end to the spring beam 118 through a mounting bracket 134 and bolts 136 and at the other end is pivotally mounted to the vehicle frame 112 through a frame bracket 170 in conventional fashion. The trailing arm suspension comprises two identical trailing arm assemblies, only one of which is illustrated in FIG. 11. A U-shaped roll stabilizer 138 is mounted at the bite portion thereof to the spring beam 18 through a U-bolt 140 and is mounted at the ends of the legs thereof to rod 142. The U-bolt is mounted to the spring beam though a mounting plate 174 in conventional fashion. The upper end of rod 142 is mounted to the frame 112 through a frame bracket 144. A thin band 168 is mounted above and below the spring beam 118. The thin band 168 is mounted at one end to the spring beam at the mounting bracket 128, is wound around the pivot mount 120 at a central portion and is mounted at the outer end to the spring beam above the mounting plate 174.

The foregoing has been a partial description of a conventional suspension system for an I-beam steer axle which has been publicly sold by the Holland Neway International and its predecessors in interest prior to this invention except that the suspension includes a shock absorber mounted relatively vertically between an end of the trailing arm and the vehicle frame. This suspension is more fully disclosed in literature entitled Holland Neway AS-Series R.V./Bus Air Steer Suspension, AS-090/120/140, published by Holland Neway International, Inc. of Muskegon, Mich., USA in 1999, which is incorporated herein by reference. According to the invention, a variable geometry damping mechanism is mounted between the frame bracket 116 and the spring beam 118. The variable geometry damping mechanism is mounted between the frame bracket 116 and the spring beam 118. The variable geometry damping can also be mounted directly to the frame 112. A shock absorber 146 is pivotally mounted to the hanger bracket 116 through a pivot mounting 148. The shock absorber 146 has an extension rod 150 that is pivotally mounted at its outer end to one end of a lever member 152 through a pivot mounting 154. The lever member 152 is pivotally mounted at another end to a pivot bracket 156 through a pivot mounting 158. The pivot bracket 156 is secured to the spring beam 118 through bolts 160. A link member 162 is pivotally mounted at one end to an intermediate portion of the lever member 152 and at another end is pivotally mounted to the frame 112 through a pivot mounting 164 which can be a conventional doughnut pivot mounting. The suspension system shown in FIG. 11 is dampened by the variable geometry dampening assembly in a non linear manner in accordance with the curves illustrated in FIG. 13. The non-linear response of the dampening mechanism tunes the spring rate to an enhanced comfort level for the suspension.

Figure 12:
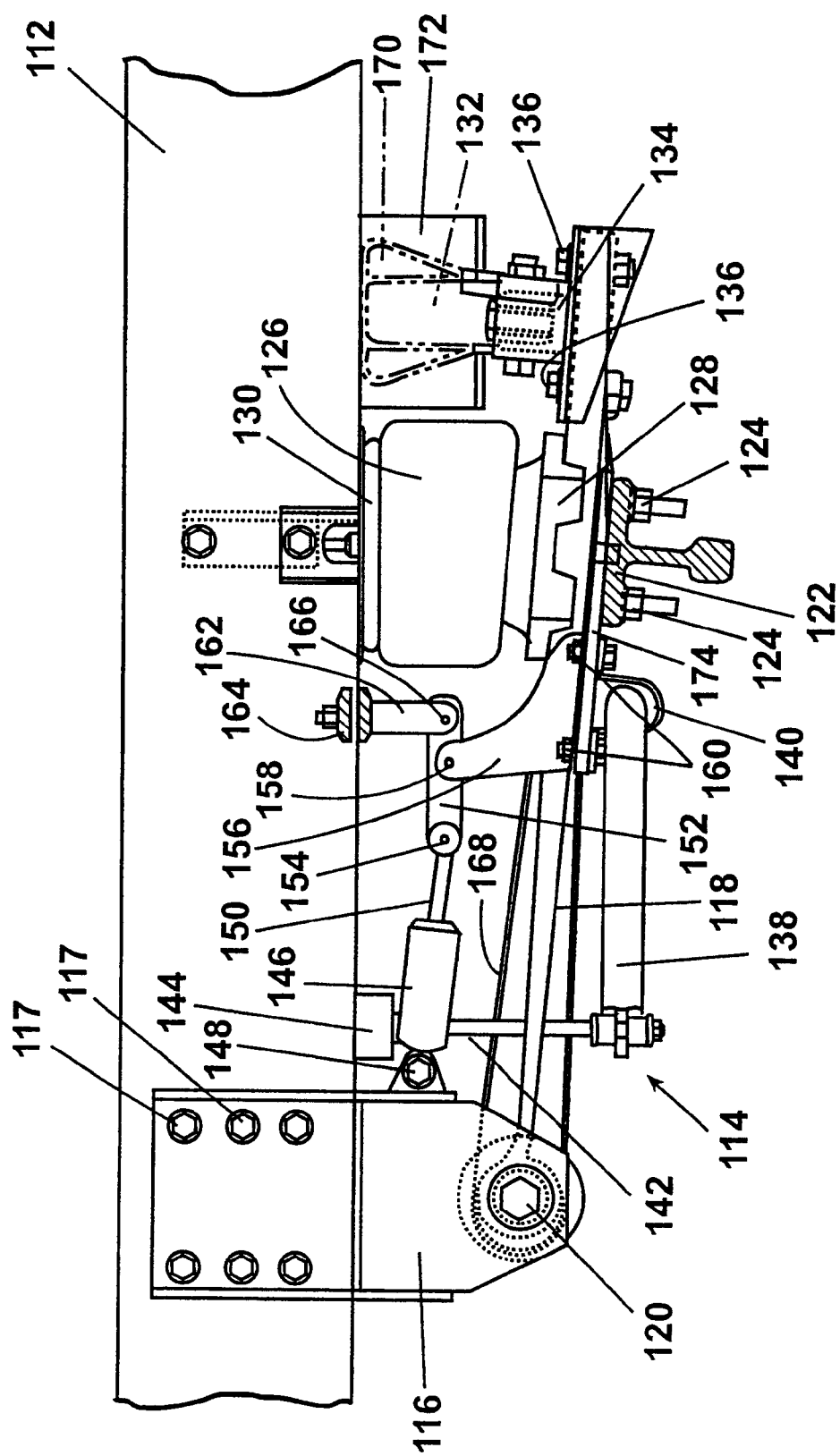
FIG. 12 is a side elevational view, like FIG. 11, of a steerable axle air suspension according to the invention and incorporating a second embodiment of a variable geometry damping mechanism.

Referring now to FIG. 12, there is shown an alternative embodiment of the invention shown in FIG. 11, where like numerals have been used to describe like parts. In the embodiment of FIG. 12, the relative position of the lever pivot 158 and the link pivot 166 have been interchanged. Otherwise the suspension is the same and the operation of the suspension of FIG. 12 is similar to the operation of the suspension of FIG. 11.

While the invention has been specifically described in connection with certain specific embodiments thereof, it is to be understood that this is by way of illustration and not of limitation. Reasonable variation and modification are possible within the foregoing disclosure and drawings without departing from the scope of the invention which is defined in the appended claims.

What is claimed is:

1. A vibration dampening assembly for isolating a suspended body from the force vibrations of a supporting body. comprising:
   (a) a first plate adapted for mounting to said suspended body or supporting body;
   (b) a second plate adapted for mounting to the other of said suspended body or supporting body;
   (c) a link member having first and second ends. said first end pivotally interconnected with said second plate at a first support pivot;
   (d) a lever member having a longitudinal axis and first and second ends. said lever member pivotally interconnected with the link member second end at a link pivot intermediate the first and second ends of the lever member;
   (e) a shock absorber having a central axis and first and second ends, said first end of said shock absorber is pivotally interconnected with said lever member second end at a shock pivot, and said second end of said shock absorber is pivotally interconnected with said second plate at a second support pivot spaced from said first support pivot; and
   (f) said lever member is pivotally interconnected with said first plate at a main pivot connection located at the first end of the lever member.

2. A vibration dampening assembly according to claim 1 wherein said shock absorber central axis and said lever member longitudinal axis are parallel when the supporting body and suspended body are in a static condition.

3. A vibration dampening assembly according to claim 2 wherein said main pivot connection also lies on the lever member longitudinal axis.

4. A vibration dampening assembly device according to claim 3 wherein said second support pivot also lies on the lever member longitudinal axis.

5. A vibration dampening assembly according to claim 4 wherein the link pivot lies on the lever member longitudinal axis.

6. A vibration dampening assembly according to claim 1 wherein said main pivot connection also lies on the lever member longitudinal axis.

7. A vibration dampening assembly according to claim 1 wherein the link pivot lies on the lever member longitudinal axis.

8. In a vehicle suspension comprising a pair of trailing arm assemblies adapted to mount on a vehicle frame having a pair of spaced frame rails, each trailing arm assembly including:
   a frame bracket adapted to be mounted to one of the frame rails;
   a beam pivotally mounted at one end to the frame bracket for pivotal movement about a pivot axis and adapted to carry an axle at another end; and
   a spring mounted to the trailing arm a spaced distance from the one end and adapted to mount to the corresponding vehicle frame rail to resist the rotational movement of the trailing arm toward the frame;
   the improvement comprising:
   (a) a link member (162) having first and second ends, said first end of said link member adapted to be pivotally interconnected with the corresponding vehicle frame rail at a first support pivot (164);
   (b) a lever member (152) having a longitudinal axis and first and second ends, said lever member is pivotally interconnected with the link member (162) second end at a link pivot (166) spaced from the second end of the lever member (152);
   (c) a shock absorber (146) having a central axis and first and second ends, said first end of said shock absorber (146) is pivotally interconnected with said lever member (152) second end at a shock pivot (154), and said second end of said shock absorber (146) is adapted to be pivotally interconnected with the corresponding vehicle frame rail at a second support pivot (148) spaced from said first support pivot (164); and
   (d) said lever member (152) is pivotally interconnected with said beam, at a main pivot connection (158) spaced from said link pivot (166).

9. A vehicle suspension according to claim 8 wherein link pivot (166) pivotally interconnecting said lever member (152) with the link member (162) second end is intermediate the first and second ends of the lever member (152).

10. A vehicle suspension according to claim 9 wherein said main pivot connection (158) interconnecting the lever member (152) with the beam is positioned at the first end of the lever member (152).

11. A vehicle suspension according to claim 8 wherein said main pivot connection (158) interconnecting the lever member (152) with the beam is positioned at the first end of the lever member (152).

12. A vehicle suspension according to claim 8 wherein link pivot (166) pivotally interconnecting said lever member (152) with the link member (162) second end is positioned at the first end of the lever member (152).

13. A vehicle suspension according to claim 12 wherein said main pivot connection (158) interconnecting the lever member (152) with the beam is intermediate the first and second ends of the lever member (152).

* * * * *